(12) United States Patent
Scherer et al.

(10) Patent No.: US 7,618,008 B2
(45) Date of Patent: Nov. 17, 2009

(54) AIR SUPPLY FOR AN AIRCRAFT

(75) Inventors: Thomas Scherer, Hamburg (DE);
Ruediger Schmidt, Fredenbeck (DE);
Alexander Solntsev, Hamburg (DE)

(73) Assignee: Airbus Deutschland GmbH (DE)

( * ) Notice: Subject to any disclaimer, the term of this patent is extended or adjusted under 35 U.S.C. 154(b) by 326 days.

(21) Appl. No.: 11/632,881

(22) PCT Filed: Aug. 11, 2005

(86) PCT No.: PCT/EP2005/008749

§ 371 (c)(1),
(2), (4) Date: Jan. 19, 2007

(87) PCT Pub. No.: WO2006/018226

PCT Pub. Date: Feb. 23, 2006

(65) Prior Publication Data

US 2008/0090510 A1    Apr. 17, 2008

Related U.S. Application Data

(60) Provisional application No. 60/601,951, filed on Aug. 16, 2004.

(30) Foreign Application Priority Data

Aug. 16, 2004   (DE) .................. 10 2004 039 667

(51) Int. Cl.
*B64C 1/00* (2006.01)
(52) U.S. Cl. ................. 244/117 R; 244/118.5; 244/129.1; 244/135 R; 244/136; 62/402; 62/427; 165/58

(58) Field of Classification Search ............. 244/117 R, 244/118.5, 129.1, 135 R, 136; 62/172, 401, 62/402, 427, 426, 186, 183; 165/58
See application file for complete search history.

(56) References Cited

U.S. PATENT DOCUMENTS 2,772,621 A * 12/1956 Arnoldi ........................ 454/71
4,378,920 A *  4/1983 Runnels et al. ......... 244/135 R
4,445,342 A *  5/1984 Warner ........................ 62/172
4,691,760 A *  9/1987 Gupta et al. ................. 165/234

(Continued)

FOREIGN PATENT DOCUMENTS

DE          33 30 556      3/1984

(Continued)

*Primary Examiner*—Michael Carone
*Assistant Examiner*—Justin Benedik
(74) *Attorney, Agent, or Firm*—Lerner, David, Littenberg, Krumholz & Mentlik, LLP

(57) ABSTRACT

Nowadays in aircraft on-board inert gas generation systems (OBIGGS) are used to generate inert gases. Cooled bleed air of engines or auxiliary turbines is fed to said OBIGGS systems. According to an embodiment of the present invention, an air supply device for an OBIGGS system in an aircraft is proposed that comprises a bleed position (1,2). By way of the bleed position (1,2), air from an air conditioning unit (4,5) on board the aircraft can be bled and can be fed to the OBIGGS system. There is thus no need for an additional heat exchanger and an additional ram-air channel. Maintenance expenditure and air resistance are thus reduced.

9 Claims, 4 Drawing Sheets

U.S. PATENT DOCUMENTS

| | | |
|---|---|---|
| 5,069,692 A | 12/1991 | Grennan et al. |
| 5,145,124 A * | 9/1992 | Brunskill et al. .......... 244/118.5 |
| 5,279,131 A * | 1/1994 | Urushihata et al. .......... 62/324.1 |
| 5,511,385 A * | 4/1996 | Drew et al. .................... 62/172 |
| 5,673,570 A * | 10/1997 | Sada ........................... 62/468 |
| 5,934,083 A * | 8/1999 | Scherer et al. ................. 62/79 |
| 6,216,981 B1 * | 4/2001 | Helm ....................... 244/118.5 |
| 6,389,826 B2 * | 5/2002 | Buchholz et al. ............... 62/172 |
| 6,415,621 B2 * | 7/2002 | Buchholz et al. ............... 62/402 |
| 6,681,592 B1 * | 1/2004 | Lents et al. ................... 62/401 |
| 7,048,231 B2 * | 5/2006 | Jones ...................... 244/135 R |
| 2001/0025506 A1 * | 10/2001 | Buchholz et al. ............... 62/401 |
| 2003/0005718 A1 | 1/2003 | Mitani et al. |
| 2004/0025507 A1 | 2/2004 | Leigh et al. |
| 2004/0060317 A1 * | 4/2004 | Lents et al. ................... 62/401 |
| 2004/0065383 A1 | 4/2004 | Jones et al. |
| 2004/0231350 A1 * | 11/2004 | Kline et al. ................... 62/244 |
| 2005/0011217 A1 | 1/2005 | Brutscher et al. |
| 2007/0267060 A1 * | 11/2007 | Scherer et al. ................. 137/13 |
| 2008/0264084 A1 * | 10/2008 | Derouineau et al. ........... 62/172 |

FOREIGN PATENT DOCUMENTS

| | | |
|---|---|---|
| DE | 103 01 465 | 8/2004 |
| EP | 1 108 458 | 6/2001 |
| EP | 1 273 514 | 1/2003 |

* cited by examiner

AIR SUPPLY FOR AN AIRCRAFT

This application claims the benefit of the filing date of U.S. Provisional Patent Application No. 60/601,951 filed Aug. 16, 2004 and of the German Patent Application No 10 2004 039 667.1 filed Aug. 16, 2004, the disclosures of which are hereby incorporated by reference.

The present invention relates to the air supply in an aircraft. In particular, the present invention relates to an air supply device for a system for generating inert gas in an aircraft, a method for the air supply of a system for generating inert gas in an aircraft, the use of a corresponding air supply device in an aircraft, as well as an aircraft comprising a corresponding air supply device.

In aircraft, so-called on-board inert gas generation systems (OBIGGS), i.e. systems for generating inert gas in an aircraft, are used. These OBIGGS systems serve for example to generate nitrogen, which is used for displacing the oxygen from the fuel tanks. Cooled bleed air (Zapfluft) from engines or from auxiliary turbines (APUs) is used as a source of air for generating inert gas. The hot bleed air, which has a temperature of 200° C., has to be cooled down to a particular temperature and has to be relaxed to a particular pressure. A conventional solution provides for an air-cooled heat exchanger in which the bleed air is cooled. The quantity of bleed air and the pressure are regulated with the use of a shut-off valve. For the purpose of cooling, external air is used, which when the aircraft is in flight is provided as ram air by the ram-air channel, while when the aircraft is on the ground is provided by an additional device (fan, jet pump). The temperature of the bleed air for the OBIGGS is regulated by means of a bypass valve and the temperature sensor.

The conventional solution for preparing bleed air for the OBIGGS provides for a separate air-cooled heat exchanger and a separate ram-air channel with the additional equipment of a fan or jet pump for ground operation. The presence of the separate heat exchangers and of the ram-air channel has the consequence of additional weight for the aircraft. Installation of the separate heat exchangers and the ran-air channel in an existing aircraft can be associated with enormous problems. The additional ram-air channel causes additional aircraft resistance in flight. Two additional openings (inlet and outlet of the ram-air channel) weaken the structure and thus require corresponding reinforcement and result in additional weight. The additional heat exchanger requires increased maintenance effort.

It is an object of the present invention to provide an improved air supply for a system for generating inert gas (OBIGGS) in an aircraft, which in particular does not require an additional ram-air channel.

According to one embodiment of the present invention, the above object is solved by means of an air supply device for a system for generating inert gas in an aircraft, comprising a first bleed position, wherein by way of the first bleed position first air can be bled from a first air conditioning unit, and wherein the first bleed air is supplyable to the system for generating inert gas.

By bleeding air from the air conditioning unit, which air is subsequently provided to the OBIGGS system, the supply of correspondingly cooled bleed air to the OBIGGS can be ensured both on the ground and in flight, without the need for providing additional ram-air channels for cooling. Thus, additional air resistance during flight, which additional air resistance would result from an additional ram-air channel, can be avoided. In particular, retrofitting of the device according to the invention is thus facilitated significantly. Furthermore, since no additional inlet and outlet of the additional ram-air channel have to be provided (because there is no additional ram-air channel), there is no weakening of the structure as a result of two additional openings. No further reinforcement is thus required, and more weight is saved.

According to a further embodiment of the present invention, the air supply device further comprises a second bleed position, wherein by way of the second bleed position second air can be bled from the first air conditioning unit. The first bled air has a first temperature, and the second bled air has a second temperature, wherein the second bled air is mixable with the first bled air and after completion of mixing is supplyable to the system for generating inert gas.

Advantageously, it can thus be ensured that the air that is fed to the OBIGGS system has a temperature which is between the first and the second temperature. This mixing temperature can be set accordingly by varying the mixing ratio.

According to a further embodiment of the present invention, the first temperature is higher than the temperature required for the system for generating inert gas. Furthermore, the second temperature is lower than the temperature required for the system for generating inert gas, and a first pressure of the first bled air and a second pressure of the second bled air is higher than a pressure required for the system for generating inert gas.

This advantageously ensures that the temperature required for the OBIGGS system can be adjusted by mixing the first and the second bled air. Furthermore, because both the first pressure and the second pressure are greater than the pressure required for the OBIGGS system there is no need to install a corresponding pressure build-up element, such as for example a pump, in the air supply device. The pressure required for the OBIGGS system is adjusted by the corresponding valve (13).

According to a further embodiment of the present invention, the first bleed position is arranged at an exit of a compressor of the first air conditioning unit, and the second bleed position is arranged at an exit of a main heat exchanger of the first air conditioning unit.

Advantageously, this makes possible simple bleeding of air from the air conditioning unit. It is particularly advantageous that the air at the compressor exit and the air at the main heat exchanger exit (exit of the main heat exchanger) has preferred temperatures and pressures.

According to a further embodiment of the present invention, the air supply device further comprises a third bleed position and a fourth bleed position and a first valve, wherein by way of the third bleed position third air can be bled from a second air conditioning unit, and wherein by way of the fourth bleed position fourth air can be bled from the second air conditioning unit. In this arrangement, the third bled air has a third temperature and the fourth bled air has a fourth temperature, wherein the third bled air is mixable with the fourth bled air and on completion of mixing is supplyable to the system for generating inert gas. Wherein the third bled air is brought together with the first bled air prior to mixing by the first valve, as a result of which, redundancy in the case of failure of an air conditioning unit is ensured. Wherein the fourth bled air is brought together with the second bled air prior to mixing by the first valve, as a result of which, redundancy in the case of failure of an air conditioning unit is ensured.

Advantageously, redundancy of the air conditioning units is thus ensured so that safe and reliable supply of correspondingly temperature-controlled and pressurised air to the OBIGGS is largely ensured.

According to a further embodiment of the present invention, the air supply device further comprises a first valve or a first temperature sensor, wherein by way of the first valve a mixing ratio of first bled air to second bled air or a total quantity of first bled air and second bled air is controllable or regulable, and wherein a fifth temperature is measurable by way of the first temperature sensor. The fifth temperature is the temperature of the air fed to the system for generating inert gas. In this arrangement, an air supply to the system for generating inert gas can be blocked off by way of the first valve.

Advantageously, it is thus possible to freely select the mixing ratio of the first bled air and the second bled air so that the temperature of the resulting mixed air is adjustable. Furthermore, blocking off the air supply to the OBIGGS can take place by way of the first valve, so that for example in the case of malfunction of the air conditioning unit a flow of very hot air from the air conditioning unit can be stopped. Advantageously, in this arrangement the temperature of the mixed air fed to the OBIGGS system is detectable by way of the temperature sensor so that the mixing ratio can be regulated accordingly.

According to a further embodiment of the present invention, the air supply device further comprises a second valve, wherein by way of the second valve the total quantity of first bled air and second bled air is controllable or regulable and wherein if the first valve (11) should fail, the second valve (13) takes over shutoff of the air supply to the OBIGGS of the first valve (11) and vice-versa.

Thus, blocking off the air supply to the OBIGGS can take place by way of the second valve so that for example in the case of a malfunction of the air conditioning unit a flow of very hot air from the air conditioning unit can be stopped.

Advantageously, redundancy of valve control is thus provided so that even in the case of failure of one of the two valves (first valve or second valve) the blocking off of the mixed air fed to the OBIGGS system still takes place.

According to a further embodiment of the present invention, the air supply device further comprises a first controller and a second controller, wherein the first controller is of a design that differs from that of the design of the second controller, and wherein the first or the second controller controls or regulates the first valve or the second valve, or measures the fifth temperature. In this arrangement, should the first controller fail, the second controller takes over the functions of the first controller.

This means that reliable control is ensured, even in the case of a critical situation on board the aircraft, as can occur for example if one or several systems fails or fail, due to controller redundancy (which is for example reflected in multiple units, different design types and different locations of the individual controllers).

According to a further embodiment of the present invention, a second temperature sensor is provided which in the case of failure of the first temperature sensor takes over the function of the first temperature sensor.

Advantageously, redundancy of the temperature sensors ensures reliable temperature measurement even in the case of partial system failure.

According to a further embodiment of the present invention, a method for supplying air to a system for generating inert gas in an aircraft is stated. In this arrangement the method involves bleeding a first air from an air conditioning unit, and feeding the first bled air to the system for generating inert gas (OBIGGS). Advantageously, a method is thus stated which states a supply of air to the OBIGGS system in an aircraft for generating inert gas, wherein the air is not provided by way of a separate ram-air channel with additional devices such as a fan or jet pump for ground operation, but by way of corresponding bleeding from an air conditioning unit on board the aircraft. There is thus no need to provide an additional heat exchanger, and cost-intensive maintenance expenditure is avoided.

Further objects, embodiments and advantages of the invention are stated in the dependent claims and in the further independent claims.

In the following, preferred embodiments of the present invention are described with reference to the figures.

In the following description of the figures, the same reference characters are used for identical or similar elements.

Figure 1:
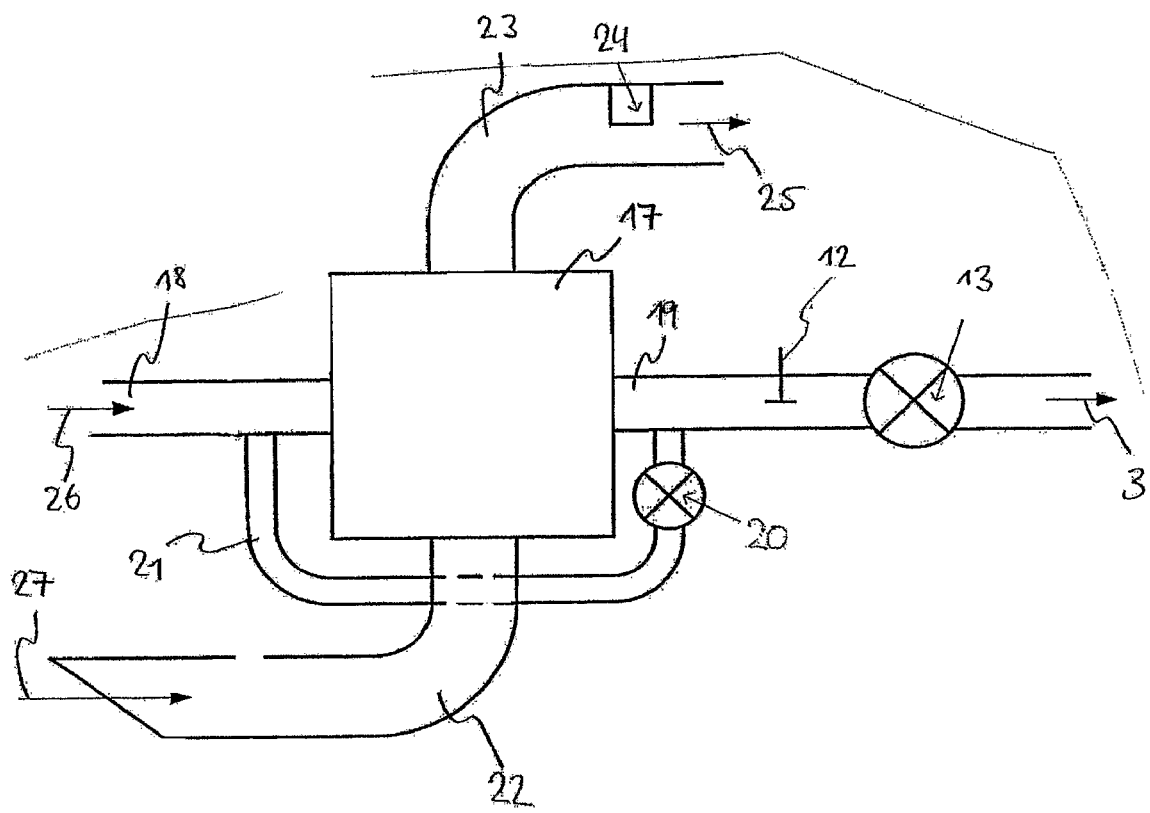
FIG. 1 shows a schematic representation of an air supply device.

FIG. 1 shows a schematic representation of an air cooling device. The air cooling device is in particular used for cooling the bleed air 26 for the OBIGGS system (not shown in FIG. 1). The device essentially comprises a heat exchanger 17, which cools down the bleed air 26 fed to the system. Bleed air 26 is provided by engines or auxiliary turbines (APUs). Typically, the temperature of the bleed air 26 is approximately 200° C., which temperature is reduced in the heat exchanger 17. To this effect the bleed air 26 is fed to the heat exchanger 17 by way of the inlet line 18, is cooled down and is subsequently fed to the OBIGGS as an air stream 3 by way of line 19. The heat exchanger 17 is air-cooled. In this arrangement air cooling takes place by way of the ram-air channel 22, 23. Furthermore, for ground operation a jet pump or a so-called "fan" 24 is provided so that a corresponding throughput of cooling air is ensured. Subsequently, the cooling air 25 is channeled to the environment.

A temperature sensor 12 is provided for monitoring the bleed air 26 cooled in the heat exchanger. Furthermore, by way of a safety device a so-called shut-off valve 13 is provided by means of which the flow 3 of bleed air to the OBIGGS can be stopped. Furthermore, the heat exchanger can be bypassed by way of the pipeline 21 and a bypass valve 20 so that temperature control becomes possible.

The quantity of bleed air and the pressure are regulated by means of the valve 13. The presence of the separate heat exchangers 17 and of the ram-air channel 22, 23 results in additional weight of the aircraft. Installation of the separate heat exchangers 17 and the ram-air channel 22, 23 in an existing aircraft can be associated with enormous problems. The additional ram-air channel 22, 23 causes additional aircraft resistance in flight. Two additional openings (inlet and outlet of the ram-air channel) weaken the structure and might require corresponding reinforcement, thus resulting in additional weight. Furthermore, the additional heat exchanger 17 involves additional maintenance expenditure.

Figure 2:
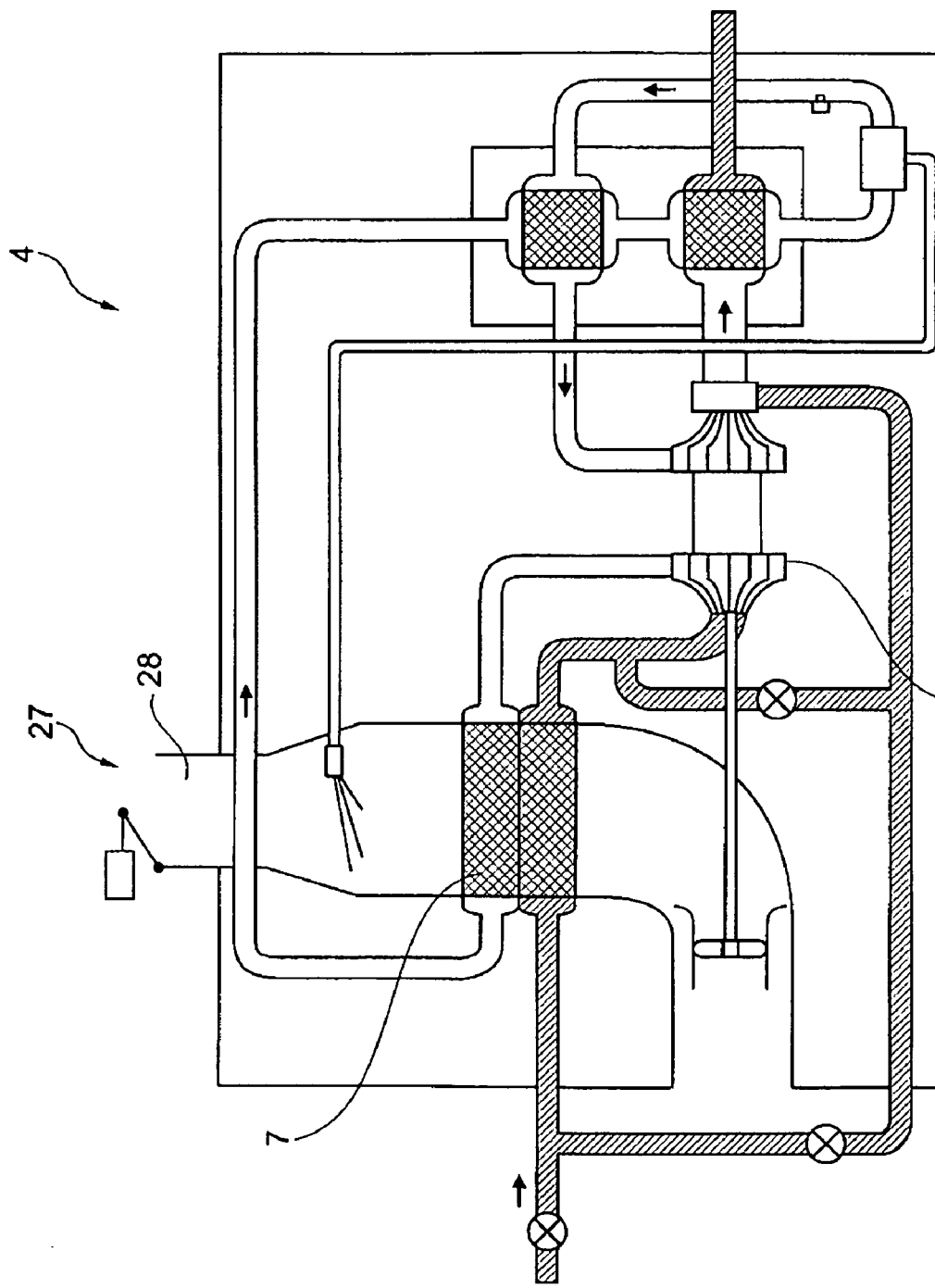
FIG. 2 shows a schematic representation of an air conditioning unit.

FIG. 2 is a schematic representation of an air conditioning unit which can be used to bleed air through an air supply system according to the invention. As shown in FIG. 2, the air conditioning unit 4 ("pack") of the air generation system (AGS) comprises a cooling circuit with a compressor 6 and a main heat exchanger 7. The air generation system in the aircraft serves to generate fresh air that is used for pressurising and air conditioning the aircraft cabin and the cockpit. Bleed air from engines or from auxiliary turbines is used as an air source for air generation. The hot bleed air (200° C.) is cooled and relaxed in the air generation system. External air, which during flight serves as ram air 27 from the ram-air channel 28, and which on the ground is provided by the air-cycle machine fan, is used for cooling. The air generation system AGS comprises two identical air conditioning units.

According to an embodiment of the present invention, within the air conditioning unit two positions are provided at which bleeding of air is possible. One position should provide air at a temperature that is higher than the temperature required by the OBIGGS, whereas the other position should provide air at a temperature that is lower than the temperature required by the OBIGGS. The pressure at these positions is to be higher than that required by the OBIGGS. For example, the first bleed position is the exit of the compressor 6, whereas the second bleed position is the exit of the main heat exchanger 7 of the air conditioning unit.

Figure 3:
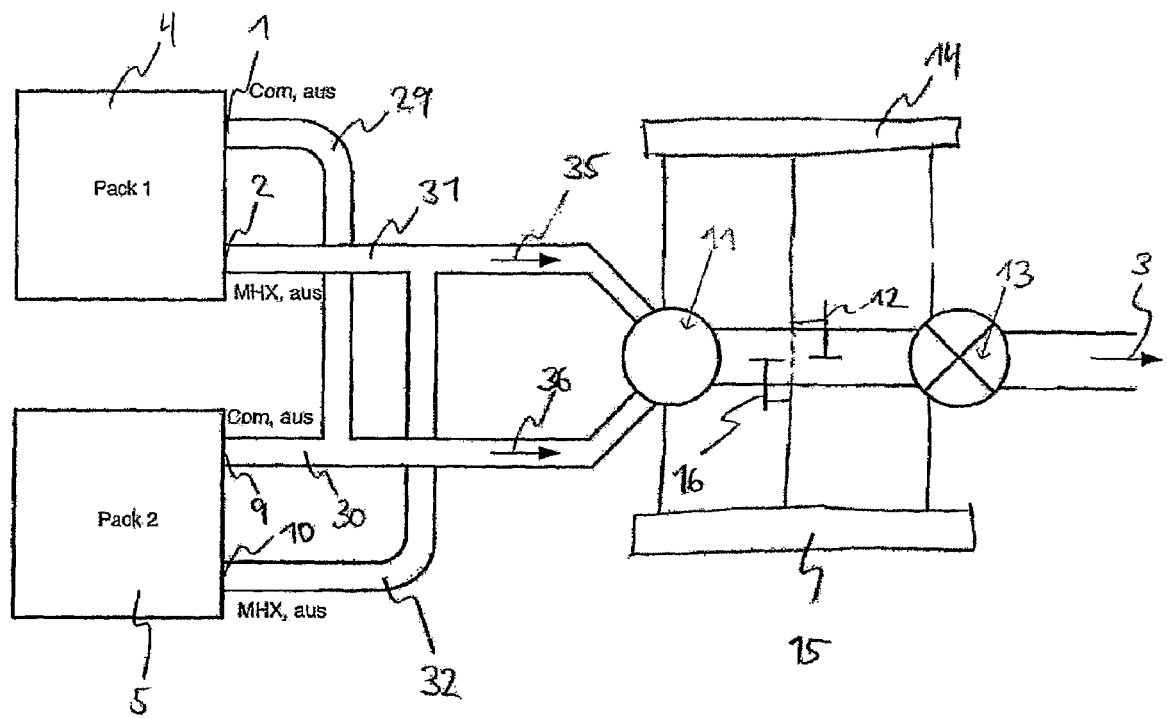
FIG. 3 shows a schematic representation of an air supply device according to an embodiment of the present invention.

FIG. 3 is a schematic illustration of an air supply device according to an embodiment of the present invention. As shown in FIG. 3, the air supply device according to the invention comprises a first bleed position 1, a second bleed position 2, a third bleed position 9 and a fourth bleed position 10. Of course, further bleed positions can also be provided, for example at further air conditioning units. In this way redundancy is further increased.

By way of the first and second bleed position 1, 2, air can be bled from a first air conditioning unit 4. The air bled from bleed position 1 is air at the exit of the compressor 6 (see FIG. 2), having an increased temperature. The air which is bled by way of bleed position 2 is air from the main heat exchanger 7 (see FIG. 2), with the temperature of said air being relatively low. Likewise, warm air is bled by way of the third bleed position 9, and cold air is bled by way of the fourth bleed position 10 from the second air conditioning unit 5.

The terms "warm" and "cold" air or "increased" and "low" temperature refer to the temperature that is required by the OBIGGS system. The temperature is approximately 75 C, in each case however clearly less than 200 C.

By way of pipelines 29, 30, the hot bled air from the first and the second air conditioning unit 4, 5 can be brought together. Furthermore, by way of pipelines 31, 32 the cooler bled air from the two air conditioning units 4, 5 can be brought together. The direction of flow of the bled air is indicated by arrows 35, 36.

The following requirements apply to the bleed air that is provided to the OBIGGS system: depending on the aircraft type, a quantity of 0.01 to 0.12 kg per second has to be provided. The temperature is approximately 76 C±6 C, and the minimum pressure of the bleed air is approximately 1.7 bar (which is a relative pressure). Furthermore, for safety reasons the failure probability of the entire OBIGGS system (including air supply) must not be more than $10^{-4}$. A limiting value of $10^{-9}$ is provided for the so-called overheating probability (probability of the tank supply temperature exceeding 200° C.).

According to an embodiment of the present invention, these requirements are met by the overall system.

Supplying cooled bleed air to the OBIGGS can be ensured both on the ground and during flight if at least one air conditioning unit 4, 5 is switched on and works properly. This requires parallel bleeding of air from both units 4, 5, as shown in FIG. 3. The temperature necessary for the OBIGGS is however regulated by means of the three-way valve 11 and the temperature sensor 12. The quantity of bleed air and the pressure are regulated by means of the shut-off valve 13.

In order to minimise the failure probability and to maximise the availability of the system, redundancy of the air conditioning units 4, 5 and the temperature sensors 12, 16 is provided. In this way an overall failure probability of less than $10^{-4}$ can be ensured.

In order to minimise (less than $10^{-9}$) the probability of overheating the fuel tank, into which the generated nitrogen is introduced (not shown in FIG. 3), the following measures are taken:

Regulating the necessary bleed air temperature and the option of bleed air shutoff (by controlling and monitoring the temperature sensor 12, 16 of the three-way valve 11 and the shutoff valve 13) is handled by two controllers 14, 15 of different design types. In this context, the failure probability of the controllers 14, 15 is, in each case, less than $10^{-5}$. Furthermore, the temperature sensor 12, 16 is designed so as to be redundant. Likewise, the option of switching off or blocking off bleed air is designed so as to be redundant. This function is for example ensured by the three-way valve 11 and the shutoff valve 13. Bleed-air switchoff is handled by both valves.

In order to achieve additional safety for controlling the valves 11, 13 and measuring the temperature by means of temperature sensors 12, 16, the redundant controllers 14, 15 are of a different design type and furthermore are accommodated at different locations in the aircraft. Should one of the two controllers 14, 15 fail, the respective other controller 15, 14 can take over the function of the failed controller.

Figure 4:
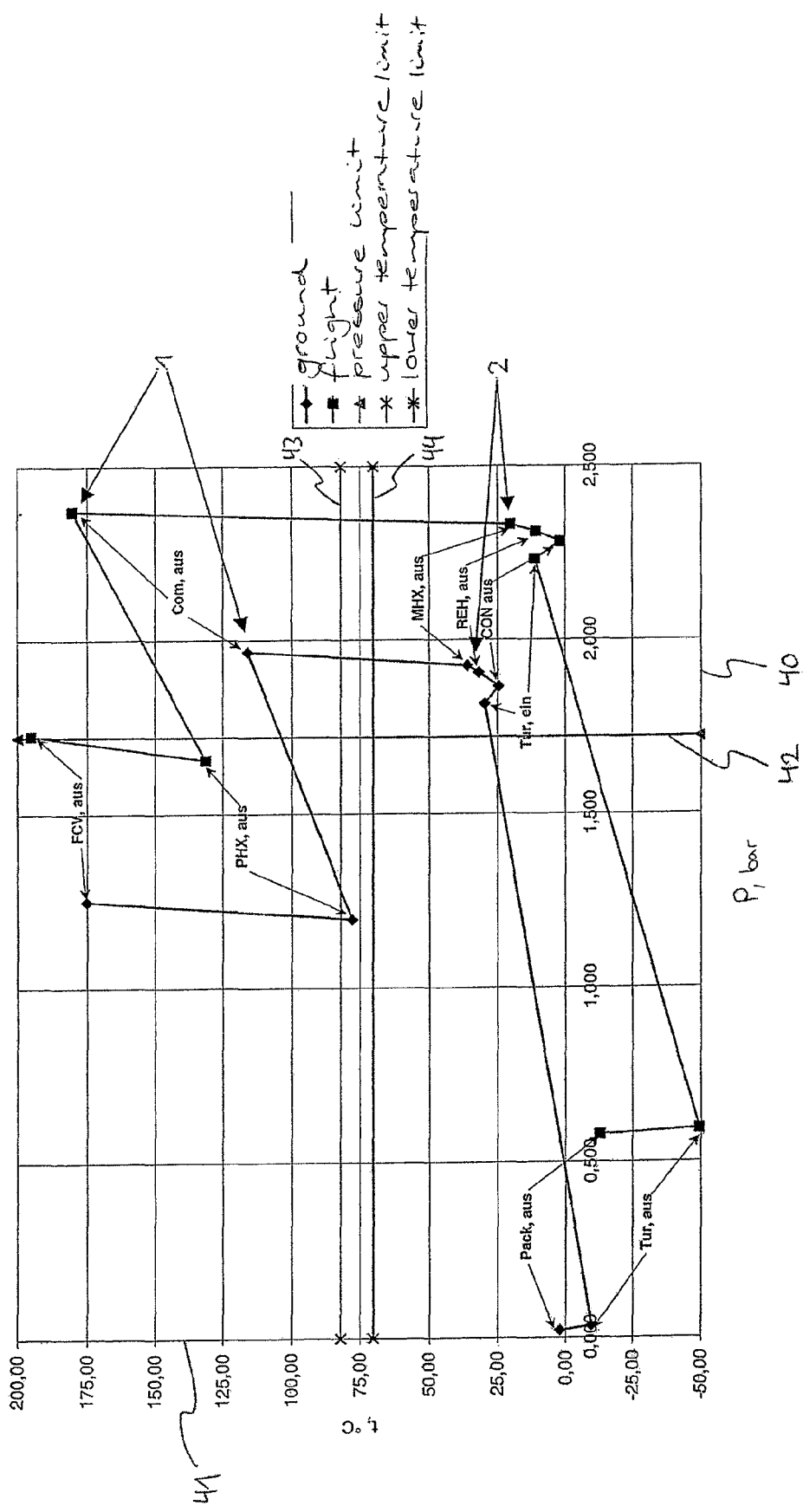
FIG. 4 shows an interrelationship between pressure and temperature at various positions within an air conditioning unit.

FIG. 4 shows the correlation between pressure and temperature at various locations within an air conditioning unit. The rhombus symbols show the corresponding pressures and temperatures within the unit on the ground when two units are used in engine operation on a hot day. The rectangle symbols show the development of the temperature and pressure at various locations within an air conditioning unit with the use of two air conditioning units used in engine operation on a hot day at an altitude of 39,000 feet. FIG. 4 shows that the above-mentioned conditions for bleeding the air are met for example at the following positions within the air conditioning unit:

Compressor exit (Com, aus);

Exit of the main heat exchanger (MHX, aus).

The horizontal axis 40 shows the pressure p in bar. The vertical axis 41 shows the temperature in degrees C. The pressure scale ranges from 0 bar to 2.5 bar. The temperature scale ranges from −50 C to +200 C.

As shown in the two graphs, the pressure and temperature of the air differs at different positions within the air conditioning unit. In particular the temperature of the air at the exit of the compressor, which is connected to bleed position 1, on the ground ranges from approximately 115 C to 120 C while the corresponding pressure of the air ranges from approximately 1.8 to 1.9 bar. In flight, the temperature at the exit of the compressor is approximately 180° C. and the corresponding pressure is approximately 2.4 bar. At the exit of the main heat exchanger, which is bled by bleed position 2, on the ground the temperature is approximately 35° C. to 40 C and the pressure is 1.8 to 1.9 bar. In flight, the temperature at this point 2 is approximately 20 C and the pressure is 2.3 to 2.4 bar.

The pressure required for supplying the OBIGGS system is shown by a vertical line 42, which is the minimum required pressure of the bleed air, which pressure is approximately 1.7 bar (relative pressure). The horizontal line 43 shows the upper temperature limit, whereas the horizontal line 44 shows the lower temperature limit of the bleed air fed to the OBIGGS. The temperature is approximately 76° C.±6° C. As can be seen from graph points 1 and 2, the values of the air bled at the exit of the compressor both during flight conditions and on the ground are above the upper temperature limit 43 and above the lower limiting pressure 42. Furthermore, the values of the air 2 bled at the main heat exchanger are above the lower limiting pressure 42 and below the lower temperature limit 44. The requirements for successful mixing of the two air quantities obtained from the two bleed positions 1, 2 are thus met.

Advantageously, the present invention provides a more compact solution that is lighter in weight for supplying the OBIGGS with bleed air. Compared to the conventional solution, the proposed solution does not have a separate heat exchanger and does not have a separate ram-air channel which provides a number of advantages. In particular, this does not entail additional aircraft weight. Furthermore, there is no above-average installation problem in existing aircraft. There is no additional aircraft resistance caused by an additional ram-air channel, and no additional reinforcement is necessary, and there is no additional weight of the structure in the region of two additional openings of a ram-air channel that would otherwise be required.

Implementation of the invention is not limited to the preferred embodiments shown in the figures. Instead, a multiplicity of variants are imaginable which use the solution shown and the principle according to the invention even in the case of fundamentally different embodiments.

In addition it should be pointed out that "comprising" does not exclude other elements or steps, and "a" or "one" does not exclude a plural number. Furthermore, it should be pointed out that features or steps which have been described with reference to one of the above embodiments can also be used in combination with other features or steps of other embodiments described above. Reference characters in the claims are not to be interpreted as limitations.

The invention claimed is:

1. An air supply device for a system for generating inert gas in an aircraft, comprising:
   a first bleed position;
   wherein, by the first bleed position, first air is bleedable from a first air conditioning unit; and
   wherein the first bled air is supplyable to the system for generating inert gas;
   a second bleed position;
   wherein, by the second bleed position, second air is bleedable from the first air conditioning unit;
   wherein the first bled air has a first temperature;
   wherein the second bled air has a second temperature; and
   wherein the second bled air is mixable with the first bled air and, after completion of mixing, is supplyable to the system for generating inert gas;
   a third bleed position and a fourth bleed position;
   a first valve;
   wherein, by the third bleed position, third air is bleedable from a second air conditioning unit;
   wherein, by the fourth bleed position, fourth air is bleedable from the second air conditioning unit;
   wherein the third bled air has a third temperature;
   wherein the fourth bled air has a fourth temperature;
   wherein the third bled air is mixable with the fourth bled air and, on completion of mixing, is supplyable to the system for generating inert gas;
   wherein the third bled air is brought together with the first bled air prior to mixing by the first valve; and
   wherein the fourth bled air is brought together with the second bled air prior to mixing by the first valve.

2. The air supply device according to claim 1,
   wherein the first temperature is higher than a temperature required for the system for generating inert gas;
   wherein the second temperature is lower than the temperature required for the system for generating inert gas; and
   wherein a first pressure of the first bled air and a second pressure of the second bled air are higher than a pressure required for the system for generating inert gas.

3. The air supply device according to claim 1,
   wherein the first bleed position is arranged at an exit of a compressor of the first air conditioning unit; and
   wherein the second bleed position is arranged at an exit of a main heat exchanger of the first air conditioning unit.

4. The air supply device according to claim 1, further comprising:
   a first temperature sensor;
   wherein, by the first valve, a mixing ratio of first bled air to second bled air is controllable or regulable;
   wherein, by the first valve, an air supply to the system for generating inert gas can be blocked off;
   wherein, by the first temperature sensor a fifth temperature is measurable; and
   wherein the fifth temperature is the temperature of the air supplied to the system for generating inert gas.

5. The air supply device according to claim 4,
   wherein a second temperature sensor is provided; and
   wherein, if the first temperature sensor fails, the second temperature sensor takes over the function of the first temperature sensor.

6. The air supply device according to claim 1, further comprising:
   a second valve;
   wherein, by the second valve, the total quantity of first bled air and second bled air is controllable or regulable;
   wherein, by the second valve, the air supply to the system for generating inert gas can be blocked off; and
   wherein, if the first valve fails, the second valve takes over shutoff of the air supply to an On-Board Inert Gas Generation System of the first valve, and vice-versa.

7. The air supply device according to claim 6, further comprising:
   a first controller and a second controller;
   wherein the first controller is of a design that differs from that of the second controller;
   wherein the first or the second controller controls or regulates the first valve or the second valve or measures the fifth temperature by the first temperature sensor; and
   wherein, if the first controller fails, the second controller takes over the function of the first controller.

8. An aircraft comprising an air supply device for generating inert gas in the aircraft, the air supply device comprising:
   a first bleed position;
   wherein, by the first bleed position, first air is bleedable from a first air conditioning unit; and
   wherein the first bled air is supplyable to the system for generating inert gas;
   a second bleed position;
   wherein, by the second bleed position, second air is bleedable from the first air conditioning unit;
   wherein the first bled air has a first temperature;
   wherein the second bled air has a second temperature; and
   wherein the second bled air is mixable with the first bled air and, after completion of mixing, is supplyable to the system for generating inert gas;
   a third bleed position and a fourth bleed position;
   a first valve;
   wherein, by the third bleed position, third air is bleedable from a second air conditioning unit;
   wherein, by the fourth bleed position, fourth air is bleedable from the second air conditioning unit;

wherein the third bled air has a third temperature;
wherein the fourth bled air has a fourth temperature;
wherein the third bled air is mixable with the fourth bled air and, on completion of mixing, is supplyable to the system for generating inert gas;
wherein the third bled air is brought together with the first bled air prior to mixing by the first valve; and
wherein the fourth bled air is brought together with the second bled air prior to mixing by the first valve.

9. A method for supplying air of a system for generating inert gas in an aircraft, comprising:
bleeding a first air from a first air conditioning unit by a first bleed position;
feeding the first bled air to the system for generating inert gas;
bleeding a second air from the first air conditioning unit by a second bleed position;
mixing the first bled air with the second bled air;
supplying the mixture of first bled air and second bled air to the system for generating inert gas;
wherein the first bled air has a first temperature;
wherein the second bled air has a second temperature;
bleeding a third air and a fourth air from a second air conditioning unit;
wherein the third bled air has a third temperature;
wherein the fourth bled air has a fourth temperature;
wherein the third bled air is mixable with the fourth bled air and, on completion of mixing, is supplyable to the system for generating inert gas;
wherein the third bled air is brought together with the first bled air prior to mixing by a first valve so that the redundancy in the case of failure of an air conditioning unit is ensured; and
wherein the fourth bled air is brought together with the second bled air prior to mixing by the first valve so that the redundancy in the case of failure of an air conditioning unit is ensured.

* * * * *